United States Patent [19]
Fletcher et al.

[11] 3,726,390
[45] Apr. 10, 1973

[54] METHOD AND APPARATUS FOR CONVEYING MATERIALS

[75] Inventors: Ralph A. Fletcher, Bedford, N.H.; Joseph R. Oliver, Lowell, Mass.

[73] Assignee: H. E. Fletcher Co., Westford, Mass.

[22] Filed: Aug. 12, 1970

[21] Appl. No.: 63,159

[52] U.S. Cl. ............................................. 198/190
[51] Int. Cl. ............................................. B65g 15/12
[58] Field of Search ............... 198/19, 190, 121–123, 198/208; 143/49 R; 125/23 C, 23 R

[56] References Cited

UNITED STATES PATENTS

| | | | |
|---|---|---|---|
| 707,613 | 8/1902 | McCabe | 198/190 |
| 1,304,362 | 5/1919 | Panoulias | 198/190 X |
| 2,759,594 | 8/1956 | Kleboe | 198/190 |
| 3,224,565 | 12/1965 | Houser | 198/190 |
| 296,509 | 4/1884 | Bartholomew | 198/208 X |
| 1,170,611 | 2/1916 | Coulbourn | 198/208 X |

*Primary Examiner*—Edward A. Sroka
*Attorney*—Munroe H. Hamilton

[57] ABSTRACT

Relatively heavy loads are conveyed along a desired path of travel by positioning the loads on a plurality of spaced endless conveyor elements which are held under high tension. The endless conveyor elements are led around rotating driver sheave means which advance the conveyor elements and load in a desirably controlled manner. Load bearing portions of the endless conveyor elements are received at separated points in rolling contact with separated roller supporting surfaces. The method of conveying and the apparatus devised for carrying out the method are useful especially in handling relatively large blocks of stone such as granite, and particularly where the blocks are required to be processed in a cutting machine of the guillotine type in which a set of aligned cutting elements are moved up and down in a common plane of reciprocating movement to cut up the block into dimension stone pieces of uniform size. The endless conveyor elements may be selectively controlled to guide and position the block during and after each cutting operation.

3 Claims, 15 Drawing Figures

Inventors:
Ralph A. Fletcher,
Joseph R. Oliver,
by Hamilton
Attorney 3,726,390

METHOD AND APPARATUS FOR CONVEYING MATERIALS

BACKGROUND OF THE INVENTION

1. Field of the Invention

This invention relates to improved methods and means for conveying materials along a desired path of travel. The method of the invention and the apparatus devised for carrying out the method have been designed for use especially in handling relatively large blocks of stone such as granite where the blocks are required to be cut up into dimension stone pieces of the class commonly produced and sold in the granite industry.

2. Description Of The Prior Art

In thus processing a block of granite, for example, it is customary in the art to employ a "guillotine type machine" and the term "guillotine" or "guillotine type" as employed in the specification, refers to a machine having vertically movable cutting blades which may, in some cases, comprise hydraulically powered sets of chisels which can be engaged with top and bottom surfaces of a block of stone to carry out vertical cutting. One typical machine of the guillotine type referred to is the Hydrasplit Machine, manufactured and sold by the Park Tool Co. of St. Cloud, Minn.

In positioning a block of granite in a properly aligned position in the cutting station of a guillotine type machine, it is essential to provide a method and means for supporting the block of granite and conveying it into a cutting position in a precisely controlled manner. For this purpose, it has been customary to utilize roller type conveyors of standard form and construction, arranged to extend away from the lead-in side of the guillotine machine.

Difficulty is experienced with roller type conveyors in conveying relatively large blocks of granite which frequently may weigh as much as 8 to 10 tons and up to 15 or 20 tons, in some cases. The exceedingly heavy loads constituted by blocks of granite of this size, especially where continuous operations are required to be carried out for extended periods, tend to cause excessive wear in a roller type conveyor. Such wear may take place in the rollers as well as their bearings and rotating parts, and is hastened by periodic application of hydraulically induced pressure during cutting. The result of this excessive wear is expensive repairs and replacement operations with loss of operating time and curtailing of production output.

Positioning blocks of granite in the cutting station of a guillotine type machine may, in addition to the problem of excessive conveyor wear, present other difficulties. Thus it is highly essential to provide for square alignment of the block of granite in the cutting station of the guillotine machine, and this may involve moving one side or the other of the block in order to obtain a true alignment. Then too, the heavy fluid pressure forces acting through the sets of cutting chisels develop very large instantaneous side thrust forces which may cause displacement of the block rearwardly along the conveyor. When this occurs the block usually stops in a skewed position and has to be re-aligned.

SUMMARY OF THE INVENTION

It is, therefore, a general object of the invention to provide an improved method and apparatus for conveying relatively heavy loads along a desired path of travel without excessive wear occurring.

Another specific object is to devise an improved method and means for periodically advancing heavy blocks or masses of granite into a cutting station in a machine of the guillotine type, utilizing a combination roller and cable conveyor in which bearings and rotating parts are protected from excessive wear.

Still another object of the invention is to provide a conveyor method and apparatus by means of which heavy blocks of stone may be advanced in a precisely controlled manner and selectively positioned with reference to a desired line of cutting in a guillotine type machine.

As one means of controlling conveyor wear in handling heavy granite blocks of the size earlier indicated, and having in mind the other objectives noted above, a concept has originated for redistributing the weight of a granite block or other heavy load based on the idea of utilizing spaced rollers in a frame as a means for supporting a plurality of tensioned endless conveyor elements arranged to be independently driven while remaining in rolling contact with peripheral surfaces of the rollers.

This concept has been effectively implemented by the discovery that suitable endless conveyor elements capable of withstanding very heavy compressive loads may be comprised by cables of steel or other suitable material subjected to large tensioning forces and especially cables made up of tensioned steel strands as constituted by a wire rope.

Use of endless conveyor elements has heretofore been regarded as having limitations in the magnitude of load which could be handled because of difficulty in generating sufficient drafting forces by sheave surfaces around which the endless conveyor elements must be frictionally engaged.

However, we have determined in our invention that tensioning forces of very large magnitude can be practically exerted in an endless conveyor of the twisted wire rope class without breaking the wire rope, and we find that these very large tensioning forces may be effectively employed to provide for engaging the wire rope with rotating sheave surfaces so as to generate sufficient frictional drafting forces to move large masses of granite as well as other materials.

BRIEF DESCRIPTION OF THE DRAWINGS

The nature of the invention and its other objects and novel features will be more fully understood and appreciated from the following description of a preferred embodiment of the invention selected for purposes of illustration and shown in the accompanying drawings, in which:

FIG. 7 is a perspective view of another form of tensioned endless conveyor apparatus shown combined with a guillotine type stone cutting machine;

DESCRIPTION OF THE PREFERRED EMBODIMENTS

Figure 8:
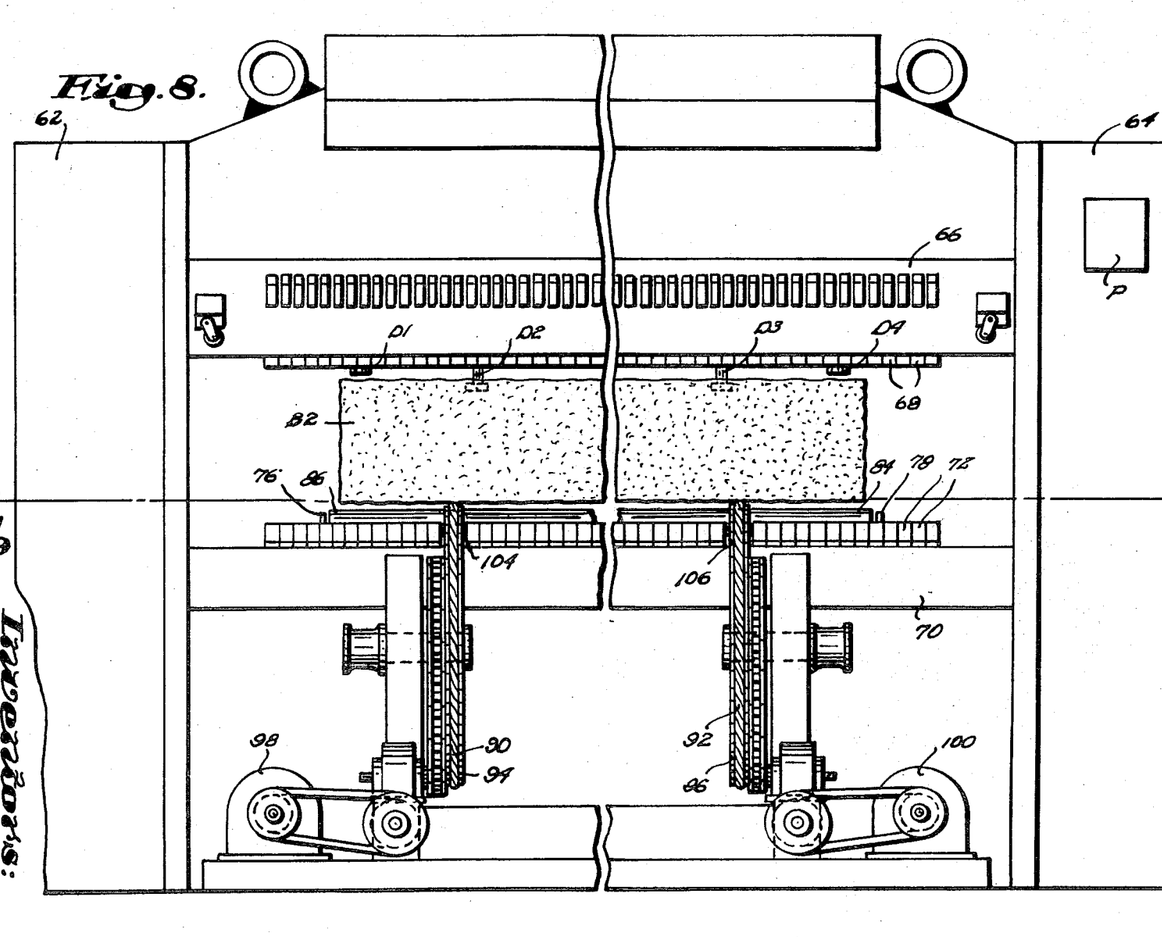
FIG. 8 is an end elevational view of the apparatus shown in FIG. 7 and further illustrates a block of granite in a position it assumes when being moved by the conveyor apparatus.
Figure 9:
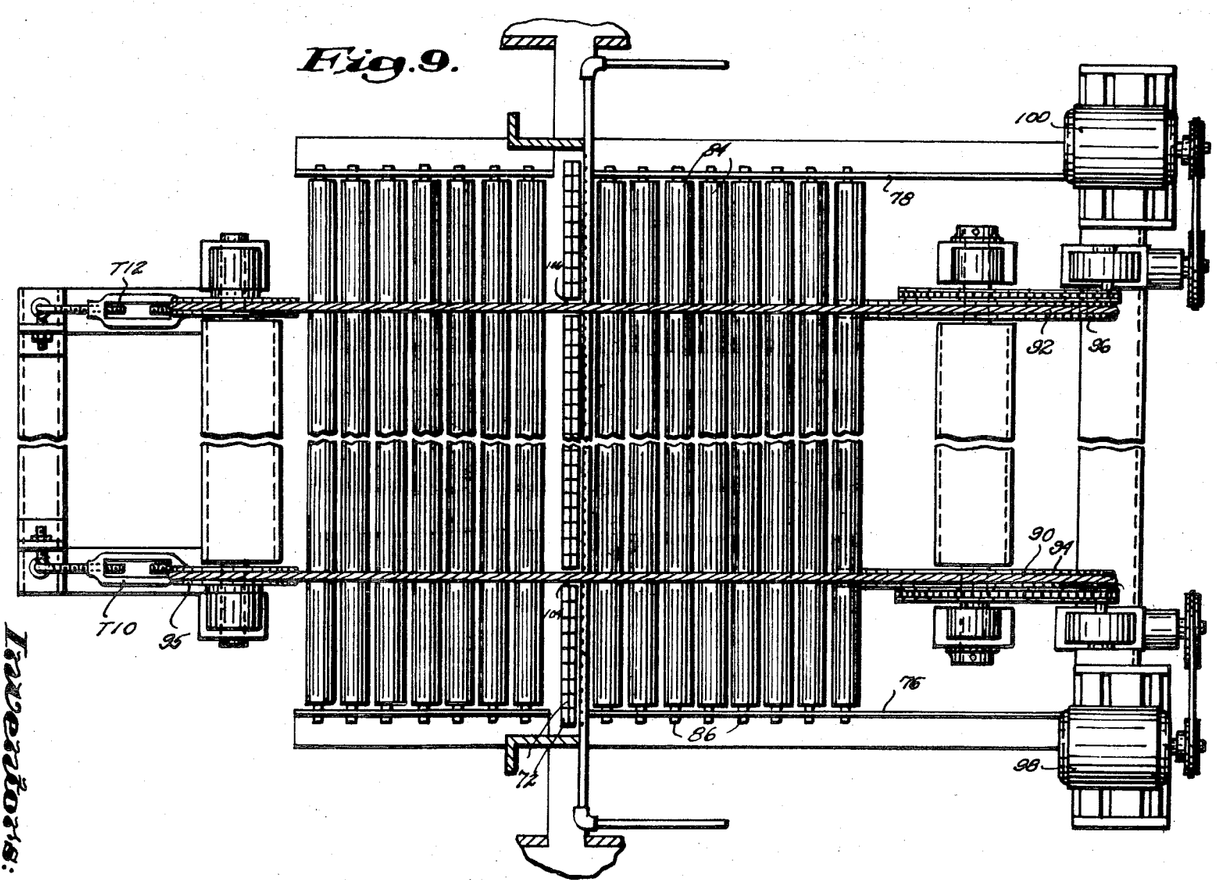
FIG. 9 is a plan cross-sectional view taken on the line 9 — 9 of FIG. 8.
Figure 11:
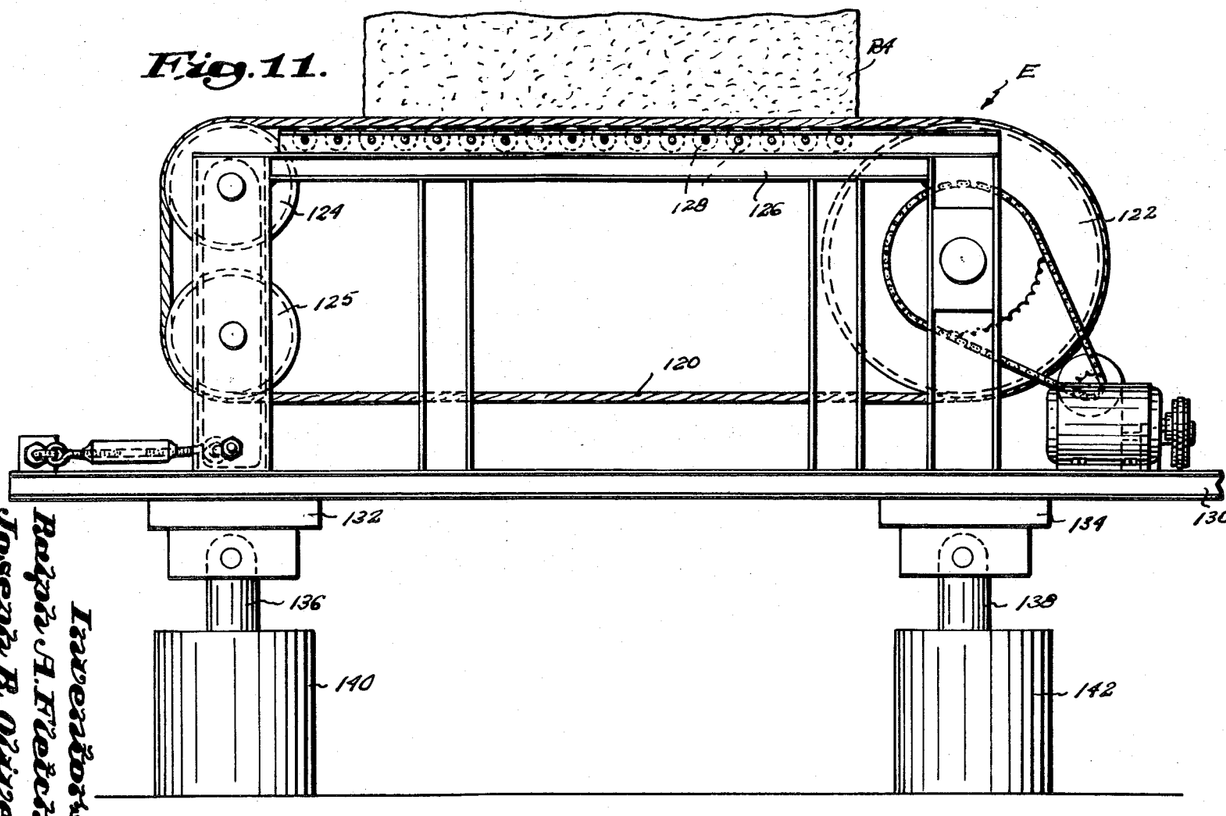
FIG. 11 is a side elevational view of a modified form of tensioned endless conveyor apparatus and further illustrating hydraulic lift mechanism for tilting the conveyor apparatus into desired positions of angularity.

The method and apparatus of the invention has been illustrated in the drawings in connection with two typical conveying operations relating to the transporting of heavy granite blocks from one point to another. In the first case, a simplified form of conveyor is illustrated in FIGS. 1 to 6 inclusive. In a second case, a conveyor apparatus combined with a guillotine machine are illustrated in FIGS. 7 to 9, inclusive.

In each instance, there is illustrated a method of carrying a heavy block of granite along a desired path of travel in which the granite block may be positioned on a pair of spaced apart conveyor elements which are received on separated roller supporting surfaces. In this method, there are carried out the steps of leading the conveyor elements around arcuate driver surfaces under tension, and controlling the tension and extent of arcuate engagement of the conveyor elements with the driver surfaces to provide drafting forces which exceed the resistance forces imposed by the weight of the load on the conveyor elements and the underlying roller surfaces.

It will be understood that in describing the method and apparatus of the invention in reference to transporting granite blocks from one point to another, it is not intended to limit the invention to such a material, and various other heavy masses may also be handled where this is desired.

Figure 1:
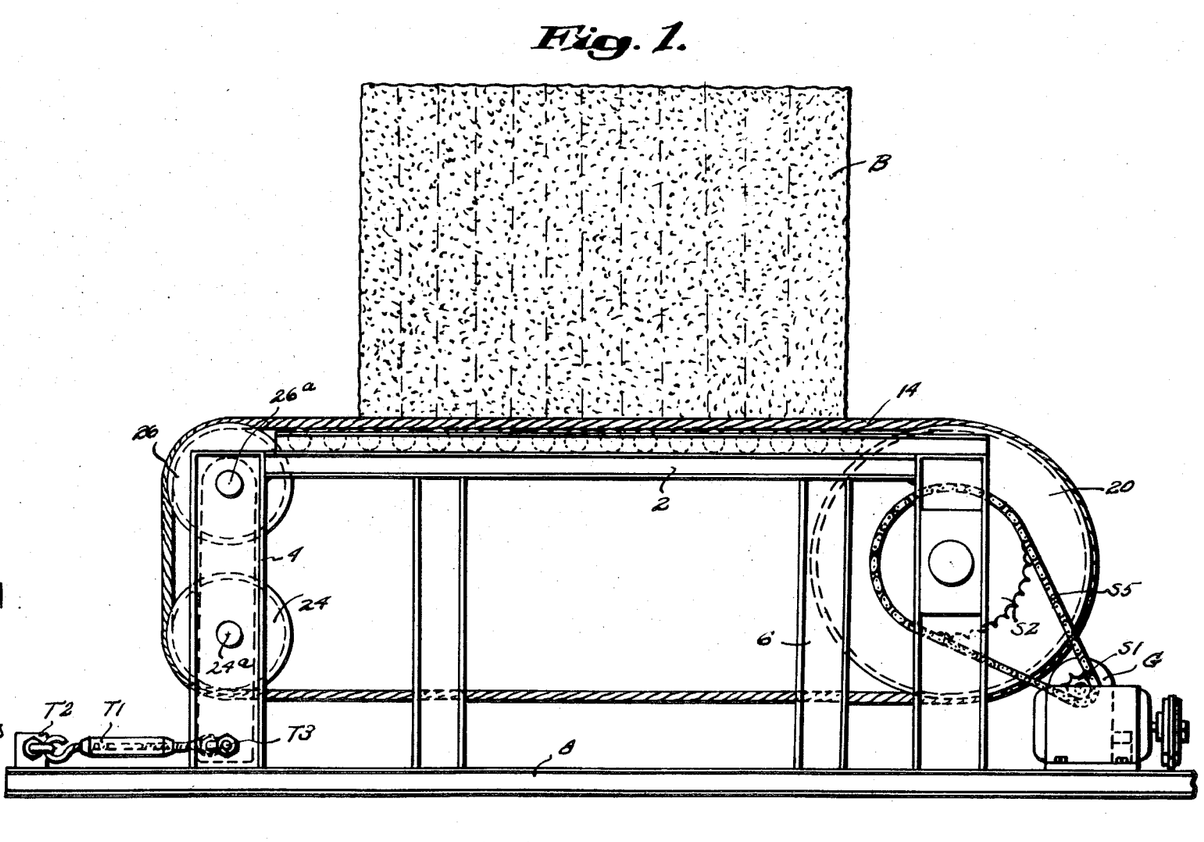
FIG. 1 is a side elevational view of one form of conveyor apparatus of the invention in which tensioned endless conveyor elements and supporting rollers are illustrated in a typical operative position for conveying a block of granite.

In FIG. 1, we have illustrated a typical granite block B which is customarily required to be transported from one point to another in a granite processing mill and which may range in weight from a few hundred pounds up to several thousand pounds. It should be noted that in many cases, the block B, as it reaches the mill from the granite quarry, may have a rough, uneven bottom surface. This tends to create more pressure at some points than at others in a conventional conveyor which results in rapid wear and break-down of the rollers and their bearings.

In accordance with the present invention, the weight of the block B is distributed in such a way that none of the rollers is excessively weighted regardless of whether the granite block is formed with a rough, uneven surface or not.

Referring more in detail to the form of conveyor apparatus illustrated in FIGS. 1 to 6, inclusive, numerals 2 and 3 denote a pair of roller frames which are supported in a raised position on uprights 4 and 6, in turn, received in a base 8. Rotatably mounted in the roller frame 2 is a set of separated roller elements 10 which extend transversely between the two sides of frame 2 as is most clearly shown in FIG. 2. Similarly, a second set of rollers 12 are rotatably mounted between the sides of the frame 3.

Figures 2, 10:
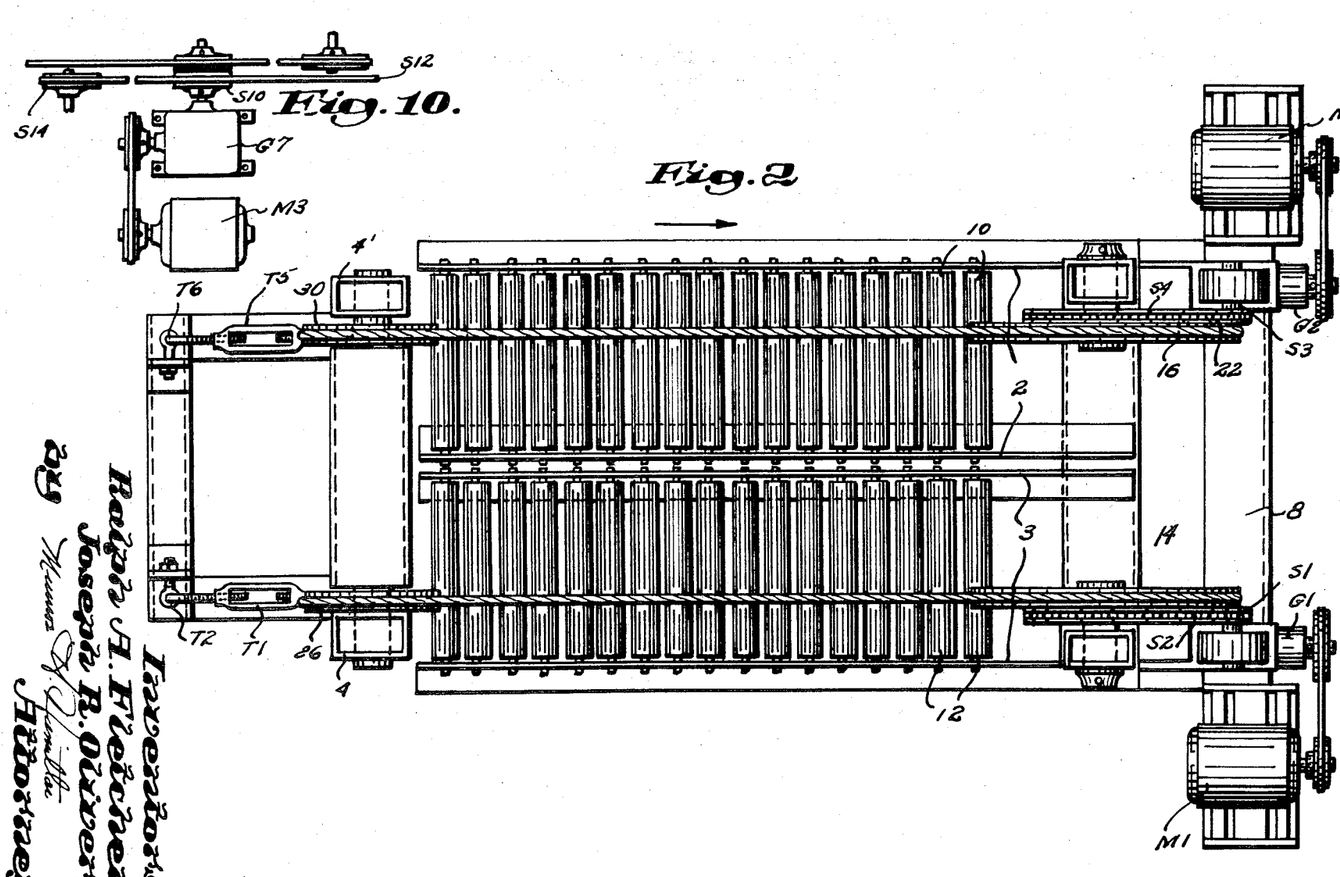
FIG. 2 is a plan view of the conveyor apparatus shown in FIG. 1.
FIG. 10 is a detail plan view of another form of power driving means for the conveyor mechanism shown in FIGS. 1 to 6, inclusive.
Figure 2:
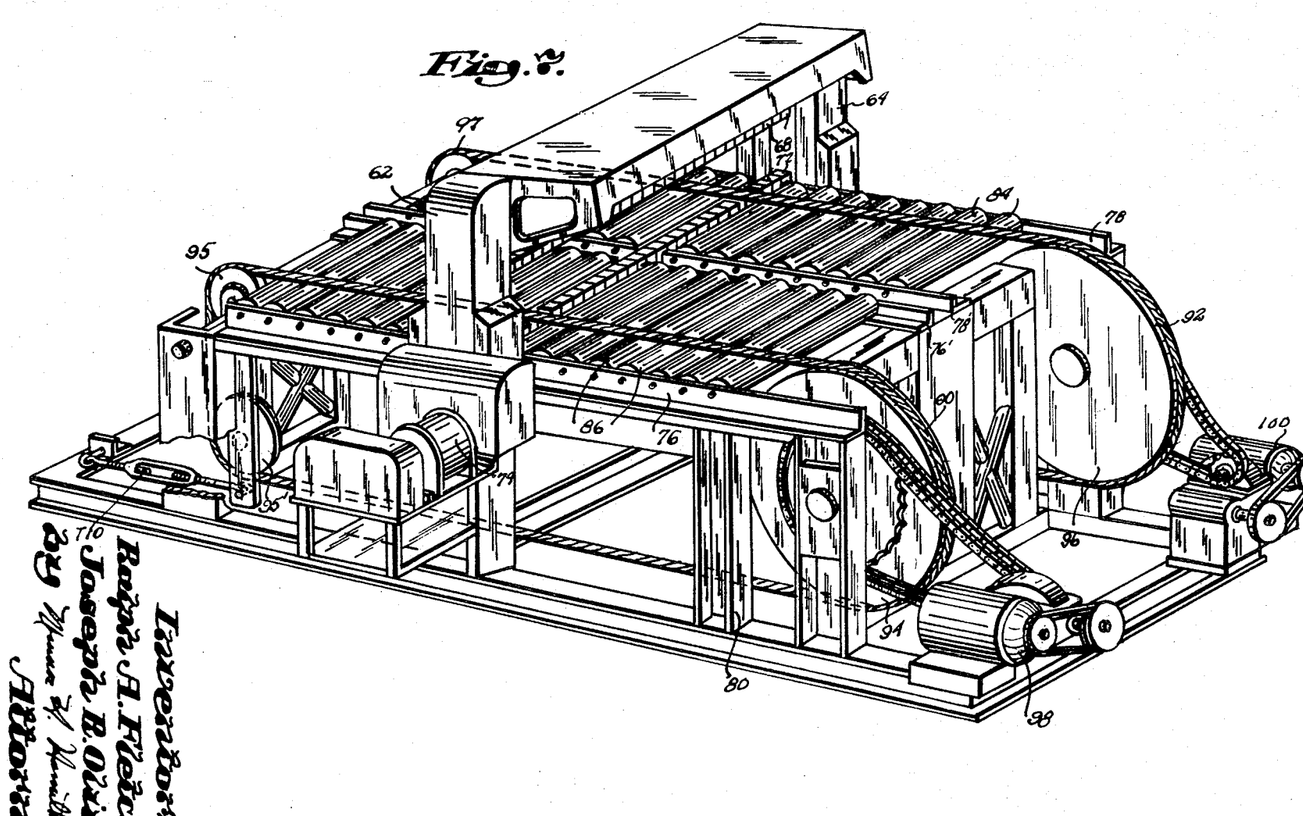

In combination with the roller elements 10 and 12, we provide a pair of endless conveyor elements 14 and 16 which are preferably comprised by twisted strands of steel wire formed into wire ropes. As indicated in FIGS. 1 and 2, these endless conveyor elements are supported in rolling contact with uppermost surfaces of rollers 10 and 12 and with the rollers arranged in closely spaced relation to one another, the endless conveyor elements form short spans which bridge the spaces between the rollers.

It will be apparent that a load received on the conveyor elements and bearing more heavily at some points than others, tends to become distributed through the spans and along the roller surfaces in a desirable manner to avoid wearing the rollers at localized points. It will also be appreciated that where the load is very heavy such as in the case of large granite blocks, a considerably resistance to displacement is present, and it is necessary to exert relatively large drafting forces in the endless conveyor elements in order to overcome this resistance and move the block at a satisfactory rate of travel.

We have found that it is possible to generate drafting forces great enough to overcome the resistance noted in the case of heavy granite blocks by engaging the endless conveyor elements with arcuate friction driving surfaces and simultaneously exerting in the conveyor elements relatively high tension forces. We have further found that with a suitably large arcuate driving surface provided, we may control the intensity of the tension forces exerted in the conveyor elements in accordance with the resistance imposed by varying loads to provide a range of required drafting forces.

It is pointed out that the order of magnitude of tension forces required in combination with extended arcuate driving surfaces is very large. For example, to move a block of granite weighing approximately 20 tons, there is required a tension of approximately 2,000 pounds in each of the conveyor elements. Therefore, only materials having very high tensile strength, as well as flexibility, can be employed. An important feature of the invention is the discovery that flexible steel cables such as is comprised by the twisted steel strands of a wire rope are of a tensile strength which can withstand the necessary tensioning required and act as conveyor elements for moving blocks of granite when used with suitable extended arcs of engagement of driving sheave surfaces.

As one suitable means for meeting the conditions indicated, we have devised a multiple sheave and tensioning arrangement in which a pair of relatively large driving sheaves 20 and 22 are rotatably supported at one end of the conveyor frame. These large sheaves may have a diameter, for example, of approximately 36 inches. Also provided, are two sets of vertically spaced-apart guide sheaves located at an opposite end of the frame and indicated by the numerals 24, 26, 28 and 30. The sheaves 26 and 30 are rotatably mounted on a shaft 26a which extends through the vertical frame parts 4, 4', and this shaft serves as a pivot means about which the frame parts 4 and 4' may be pivoted. The sheaves 24 and 28 are rotatably mounted about another shaft 24a, also received through the frame parts 4 and 4' at lower points therealong. It will be observed that the arrangement of the several sets of indicated sheaves is such that the endless conveyor elements 14 and 16 are guided along substantially parallel reversing paths of travel as suggested in FIG. 1.

Figure 3:
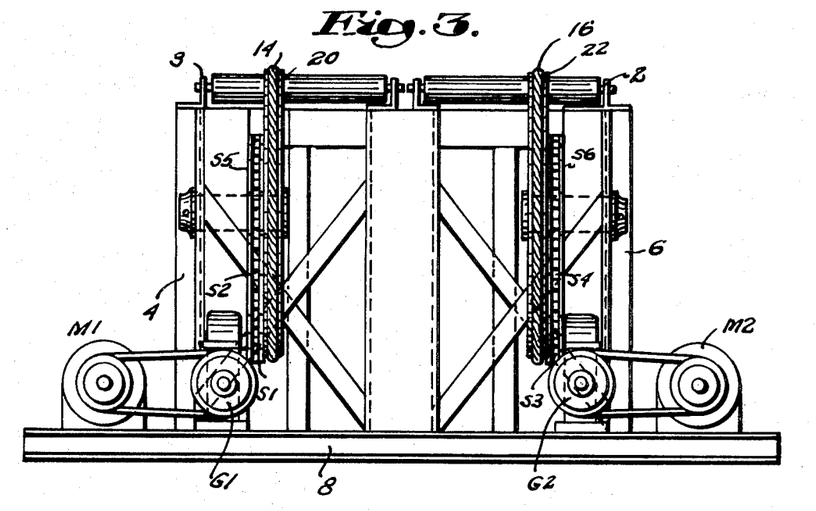
FIG. 3 is an end elevational view of the conveyor apparatus illustrating independent driving means.
Figure 4:
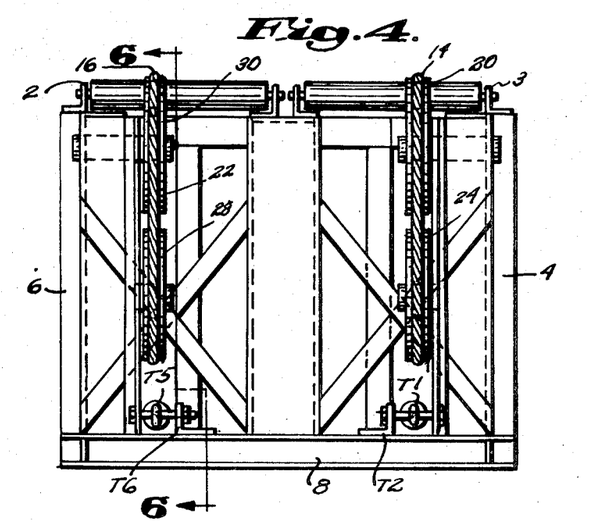
FIG. 4 is an elevational view of the conveyor apparatus viewed from an opposite end to that shown in FIG. 3, and further illustrating independent tensioning means.
Figure 5:
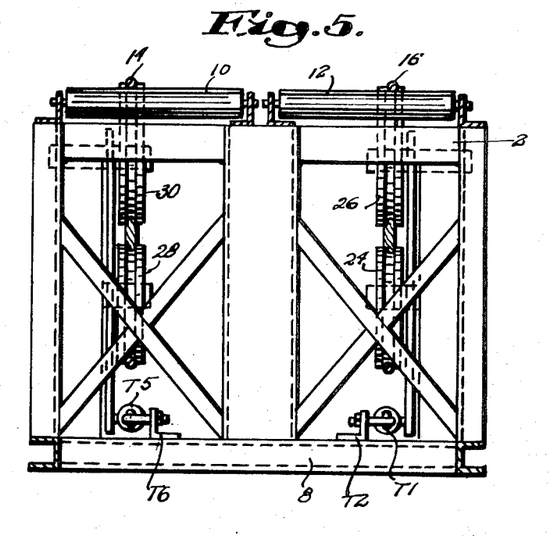
FIG. 5 is a vertical cross-sectional view of the apparatus.
Figure 6:
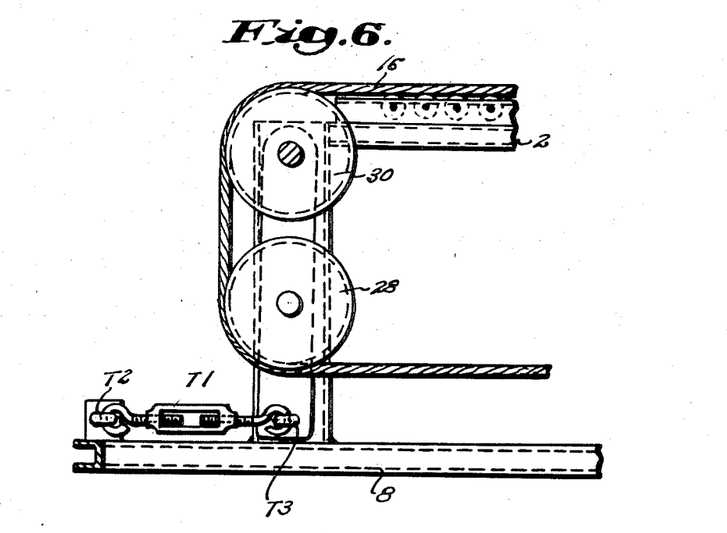
FIG. 6 is another vertical cross-sectional view taken on the line 6 — 6 of FIG. 4.

As indicated in FIGS. 1 to 3, each of the large sheaves 20 and 22 is provided with independent driving means mounted at one end of the frame base 8. In the case of sheave 20, a motor M1 drives a sprocket gear S1 by means of gear reduction apparatus G1. Sprocket gear S1 drives a chain S5, meshes with a large sprocket gear S2 fixed on a shaft for rotation with the sheave 20. Similarly the sheave 22 is driven by a motor M2 and sprocket gears S3 and S4, gear reduction apparatus G2 and chain S6. These motors M1 and M2 may be of a conventional type, and since they may be independently operated, they provide a means for selectively driving either of the endless conveyors when the other is at rest, or if desired, one endless conveyor may be driven at a faster rate of speed than the other. Since the endless conveyor elements are spaced apart a substantial distance, for example, 24 inches up to 30 inches or more, a desirable means of positioning or turning a block supported on the conveyor elements is provided and this turning or skewing may be carried out while the block is in motion.

At the opposite end of the frame 2, we further provide dual tensioning means by which each of the conveyor elements may be subjected independently to relatively large tensioning forces. As is more clearly shown in FIGS. 1, 2 and 4, the dual tensioning means are located on the frame base 8. Each of these devices includes a turnbuckle arrangement anchored to adjacent vertical frame parts 4 and 4' at the lower extremities of these members. As shown in FIG. 2, turnbuckle T1 is fixed to an angle frame part T2 and at its opposite end is anchored to a rigid bolt connection T3 at the bottom of member 4. Similarly, turnbuckle T5 is fixed to an angle frame part T6 and anchored to frame part 4'.

With apparatus of the construction now disclosed, we may, for example, transport a block of granite weighing as much as twenty tons along a mill area of considerable extent. Thus it may be required in a typical granite mill to move the block from one cutting station to another station in the mill and these cutting stations may extend over an area having a length and width of several hundred feet. In moving a block of this size, tensioning devices T1 and T2 are adjusted to increase tension, and as already noted above, the tension may be increased up to 2,000 pounds or more for the load of 20 tons indicated. This tension is found operable when using driving sheaves such as sheaves 20 and 22 having diameters of 36 inches or more, and with the extent of arcuate engagement of the conveyor elements around the respective sheaves comprising circumferential distances of from 100 inches to 120 inches or more. It will be understood that the tension forces exerted may be varied in accordance with the load imposed to produce a sufficient drafting force to move such loads at a satisfactory rate of speed. We may also utilize driving sheaves of different diameter as well as wire ropes of varying sizes.

In some cases, it may be preferable to use a single power source for driving the sheaves where independent movement of the conveyor elements is not essential as is the situation in certain stone transporting operations. As shown in FIG. 10, motor M3 may be arranged to drive a gear reduction apparatus G7 which in turn drives a common sprocket gear S10. Gear S10 operates a chain S12 which drives sprocket S14 and a large sprocket chained to suitable sprocket and drive shaft means of the class earlier described.

As noted above, it is frequently required that a block of granite be periodically moved from one point to another in processing to form specific dimension stone pieces. An instance of this is in moving a block of stone through a guillotine machine of the size employed in cutting a block of granite of the size indicated above into dimension stone pieces. Such dimension stone pieces may comprise granite curb as commonly used along highways, streets and other roadways.

In FIGS. 7 to 9 inclusive, there is illustrated a pair of endless conveyor elements in combination with a guillotine machine. In this arrangement, the endless conveyor elements are guided through specially formed passageways which are specially designed to permit each one of a pair of endless conveyor elements to continue to pass through the lower set of guillotine chisels or blocks when this lower set of blocks are moved up into a raised work engaging position against the bottom surface of a block of granite which is supported on the endless conveyors.

Considering this combination of parts in more detail, 60 denotes a guillotine machine base on which is centrally located a guillotine machine which includes vertical sides 62 and 64. In these sides are housed fluid pressure actuated rams which may be of conventional character common to guillotine machines and are therefore not shown in detail in the drawings. Located transversely between the sides 62 and 64 is an upper horizontal frame part 66 in which is mounted an upper set of chisels or blocks 68, supported for vertical adjustable movement in the manner commonly utilized in guillotine machines. Also located transversely between the sides 62 and 64 is another lower frame part 70 in which is mounted a lower set of blocks or chisels 72, which are vertically adjustable. Numeral 94 denotes apparatus for exerting fluid pressure to actuate the cutting elements of the machine and since this apparatus is also of well-known construction, no details are shown in the drawings.

Extending through the guillotine machine between the upper and lower sets of cutting elements 68 and 72 is an elongated conveyor frame consisting of horizontal sides 76, 76' and 78, 78' supported on uprights as 80. Rotatably mounted between the sides 76, 76' and 78, 78' are two sets of spaced rollers as 84, 86, of the class already described and shown in FIGS. 1 to 6 inclusive. Likewise, there is provided a pair of endless conveyor elements 90 and 92 formed of twisted steel strands corresponding to the endless conveyor elements 14 and 16 of FIGS. 1 to 6, inclusive. These conveyor elements 90 and 92 are received on the rollers 84 and 86, and are guided around large sheaves 94 and 96 together with two sets of smaller sheaves as 95, 95' and 97, 97'.

The sheaves 94 and 96 are driven by respective power driven means 98 and 100 as shown in FIGS. 7 and 8. The two sets of smaller sheaves 95, 95' and 97, 97' are pivotally mounted in uprights as shown in FIG. 7 in the same manner as the small sheaves shown in FIGS. 1 to 6, and similarly, tensioning devices T10 and T12 are provided to regulate tension in the conveyor elements 90 and 92 by pivotally adjusting one of the smaller sheaves in each set relative to the other.

It will be observed that the bottom set of blocks or chisels 72, as shown in FIG. 8, are normally located in a lowered position below a block of granite B2 such that they lie below the rollers 84 and 86 as well as the endless conveyor elements 90 and 92, and when a cutting operation is to be carried out, these blocks or chisels are raised upwardly to engage against a bottom surface of the block B2. An important feature of the invention is the provision of gaps or passageways through which the endless conveyors may be received when the lower blocks or chisels are raised into contact with the bottom of the block B2. We have found that this may be accomplished without impairing the normal cutting action of the guillotine machine by removing one or more of the cutting blocks or chisels at the points where the conveyor elements pass through the machine thus leaving gaps 104 and 106 as suggested in FIGS 8 and 9.

It is pointed out that the remaining blocks or chisels 72 are free to move upwardly into contact with the bottom surface of block B2. There is also achieved a desirable frictional holding action resulting from the conveyors being constantly weighted by the block B2. At the time a cut takes place in a conventional guillotine machine, the rear section of the block may be displaced rearwardly a considerable distance on the conventional type rollers which are free to turn in either direction. In the case of the rope conveyor elements of the invention there are substantial frictional forces resisting displacement of the block in a rearward direction, and this results in less adjustment of the block B2 having to be carried out for the next cut.

Another highly important feature of the invention is the way in which the wire rope endless conveyors may be employed to make any adjustment which becomes necessary in order to position the block squarely to the vertical plane in which cutting is to take place or to advance a squared block in reference to this same plane of cutting. By selectively utilizing the independent power driving means 98 and 100 with the aid of a control panel P, FIG. 8, one conveyor element may be driven with the other at rest, and the block B2 may thereby be turned from a skewed position into a squared position very quickly with very little loss of operator's time. Also in this squared position, the block may be quickly advanced for a precise setting required to meet a dimensional specification.

The precision and selectivity which may thus be realized by independently driven endless conveyors supported on rollers may also provide still a further important feature when employed in conjunction with novel stop means combined with the machine as illustrated in FIG. 8 of the drawings. The stop means referred to has been disclosed and claimed in co-pending application Ser. No. 31,608 filed Apr. 24, 1970. As shown in FIG. 8, there may be provided vertically adjustable stop elements as D1, D2, D3 and D4. Stops D1 and D4 are shown in a raised position and stops D2 and D3 are shown in a lowered gauging position against the block B2. As is set forth in detail in application Ser. No. 31,608, these gauging stops may be of varying sizes and when lowered into spaced relationship to the upper set of chisels 68, provide rugged abutments against which the block B2 may be positioned to provide for cutting off a desired thickness of slab or granite section. The stops D1 and D4 are spaced apart a greater distance than stops D2 and D3 in order to handle blocks of greater width.

It will be appreciated that these stop elements in their lowered position make it possible to utilize the selectively operated conveyor elements in a most efficient manner since a skewed block may be gradually moved into contact with one stop and then turned into a squared position against both stops with a highly precise setting to meet dimensional specifications. An exceedingly desirable cooperative relationship becomes possible by combining in the control panel P additional control buttons for both the stops D2 and D3 and the driving means 98 and 100.

In realizing the advantages and novel features thus disclosed by using flexible steel wire rope conveyors, it will also be observed that wire rope will withstand long periods of hard usage without wearing out and since the roller elements and their bearings are subjected to much less stress, the entire conveyor apparatus requires less servicing and repairs and when combined with a guillotine type machine assembly, eliminates much loss in time and break-down in equipment.

The versatility and efficiency of wire rope type endless conveyor apparatus may also be employed very effectively in connection with special stone cutting operations. For example, dimension stone specifications may sometimes require cutting a dimension stone piece with an angled face or in other instances, a cut may be desired parallel to an already existing angled face. For dealing with operations of this nature, we may combine the wire rope type endless conveyors with an adjustable frame which may be raised or lowered at one end or the other. Thus, in FIGS. 11 to 15, we have illustrated a tilting frame on which a block B4 may be supported on a conveyor apparatus similar in substantially all respects to the apparatus shown in FIGS. 1 to 6 inclusive. This conveyor apparatus includes conveyor means 120, driven by sheaves 122 and guided around small sheaves 124 and 125. A roller frame 126 supports rollers 128, and the entire roller frame and conveyor apparatus is mounted on an elongated base 130.

Figure 12:
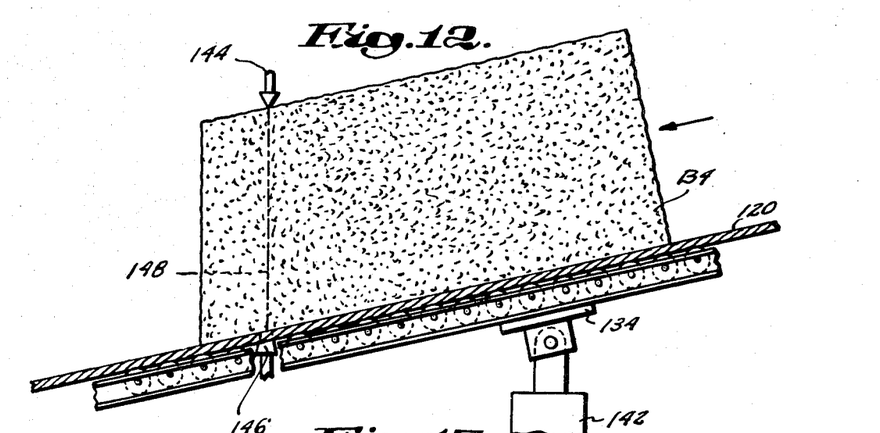
FIG. 12 is a fragmentary diagrammatic view illustrating the apparatus of FIG. 11 in one position of inclination.
Figure 13:
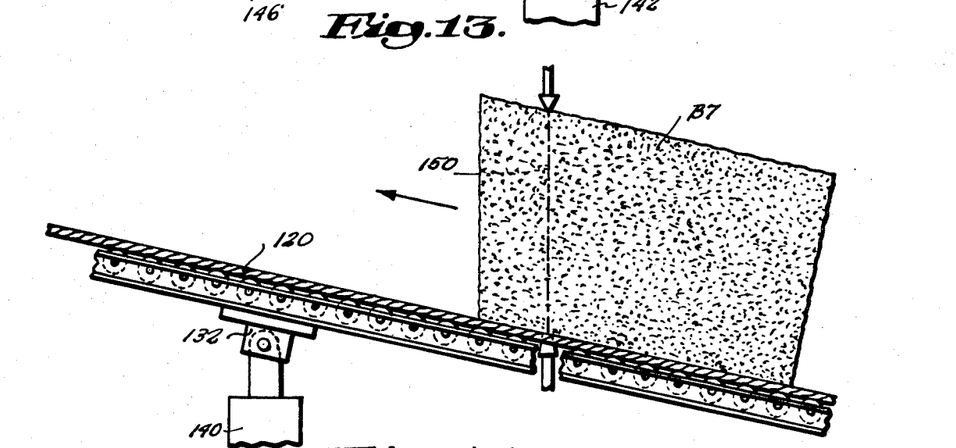
FIG. 13 is another fragmentary diagrammatic view showing the apparatus of FIG. 11 in an opposite position of inclination.
Figure 14:
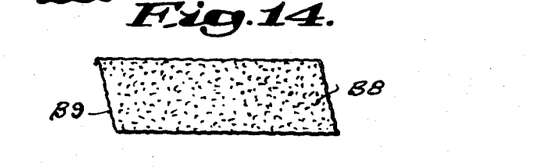
FIG. 14 is a side elevational view of a block of granite produced with the apparatus in the position shown in FIG. 13.
Figure 15:
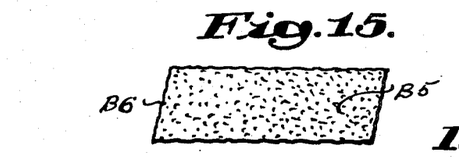
FIG. 15 is another view of a block of granite produced with the apparatus in the position shown in FIG. 12.

In accordance with the invention, this roller frame and conveyor apparatus has solidly secured to the underside of the base 130 two elevator blocks 132 and 134. Pivotally attached to the bottom of these blocks are lift rods 136 and 138 which form a part of fluid actuated cylinders or rams 140 and 142. By selectively operating one or the other of these cylinders, the conveyor apparatus may be tilted into different positions of angularity. This may be especially desirable in a stone drilling machine of the guillotine class and FIG. 12 is intended to illustrate diagrammatically a guillotine machine cutting arrangement including sets of chisels or blocks 144 and 146 for engaging with the block B4. In the position shown in FIG. 12, the conveyor apparatus is located in an upwardly inclined position of adjustment in which a cutting operation may be carried out along the dotted line 148. FIG. 15 illustrates diagrammatically a small section cut off from the block B4 and presenting a beveled edge or surface B6. FIG. 13 illustrates an opposite angle of adjustment to provide a rearwardly inclined position of the conveyor element 120. In this position the conveyor supports a block B7 for cutting along a dotted line 150. And when the cut is made, there is formed a granite section B8 as shown in FIG. 14 having an undercut surface B9.

We claim:

1. In a method of conveying a load along a desired path of travel, the steps which include locating the load on a plurality of spaced apart endless conveyor elements, engaging each of the endless conveyor elements with rotating driver means to advance the load and the conveyors along said path of travel, and continuously supporting portions of the endless conveyor elements at separated points immediately below the load as it passes along said desired path of travel, said rotating driver means being selectively controlled to vary the position of the load in relation to the conveyor elements.

2. In a method of conveying a load along a desired path of travel, the steps which include locating the load on a plurality of spaced apart endless conveyor elements, engaging each of the endless conveyor elements with rotating driver means to advance the load and the conveyors along said path of travel, continuously supporting portions of the endless conveyor elements at separated points immediately below the load as it passes along said desired path of travel, the said rotating driver means presenting friction driving surfaces and the said endless conveyor elements being held in tension while engaging the said friction surfaces, each of said endless conveyors being supported for movement in reversing directions of travel and being led around a relatively large sheave surface at one point of reversing direction and around two relatively smaller sheave surfaces at another point of reversing direction, and each of said endless conveyor elements being selectively controlled in speed and direction of movement to change the position of the load as it advances.

3. An apparatus for carrying a load along a desired path of travel, said apparatus including a frame, sheave means mounted for rotation at two opposite ends of the frame, power driving means for rotating two of the sheaves, endless conveyor elements supported in the frame and located around the sheaves at opposite ends of the frame, means for adjustably exerting tension in the endless conveyor means, and roller means mounted in the frame in a position to support the endless conveyor elements while under tension at separated points below their paths of travel, and said power driving means including independent motor means for selectively moving either one of the conveyor elements independently of the other.

* * * * *